United States Patent [19]

Lynn

[11] Patent Number: 5,146,716

[45] Date of Patent: Sep. 15, 1992

[54] PLIANT MEDIA BLASTING METHOD

[75] Inventor: William R. Lynn, Dover, N.H.

[73] Assignee: Sponge-Jet, Inc., Dover, N.H.

[21] Appl. No.: 794,600

[22] Filed: Nov. 15, 1991

Related U.S. Application Data

[63] Continuation of Ser. No. 376,764, Jul. 7, 1989, abandoned.

[51] Int. Cl.⁵ .............................................. B24C 11/00
[52] U.S. Cl. ........................................ 51/320; 51/436; 51/425
[58] Field of Search ................. 51/436, 321, 413, 320; 134/7; 222/637, 227, 239, 236, 240, 241–242; 241/184

[56] References Cited

U.S. PATENT DOCUMENTS

| 1,444,648 | 2/1923 | Willis et al. | 222/236 |
| 1,559,666 | 11/1925 | Bernier | 222/241 |
| 1,752,956 | 4/1930 | Lex | 222/241 |
| 2,624,988 | 1/1953 | Vander Wal | 51/320 |
| 3,461,478 | 8/1969 | Taylor | 134/7 |
| 3,716,066 | 2/1973 | Currier et al. | 134/7 |
| 4,158,576 | 6/1979 | Butz | 134/7 |
| 4,545,155 | 10/1985 | Nakata | 51/321 |
| 4,589,234 | 5/1986 | Rebhan et al. | 51/436 |
| 4,731,125 | 3/1988 | Carr | 51/320 |
| 4,827,678 | 5/1989 | MacMillan et al. | 51/425 |

FOREIGN PATENT DOCUMENTS

| 0874693 | 4/1953 | Fed. Rep. of Germany | 134/7 |
| 2717287 | 10/1978 | Fed. Rep. of Germany | 134/7 |
| 2840029 | 11/1979 | Fed. Rep. of Germany | 222/240 |
| 0816363 | 7/1959 | United Kingdom | 222/227 |

Primary Examiner—Robert A. Rose
Attorney, Agent, or Firm—Felfe & Lynch

[57] ABSTRACT

The invention relates to a pliant particulate media method which utilizes providing an air source for supplying air pressure to a supply container, containing a quantity of pliant blasting media, and a discharge line. The container is connected with a mechanical feed device that positively meters out a desired quantity of blasting media into a discharge line which conveys the blasting media to a discharge nozzle where it is discharged against a surface to be treated to achieve the desired treatment. The invention additionally relates to a recovery method for separating the pliant blasting media from the debris and the other unwanted materials and a method for removing undesired liquids and chemicals from the pliant blasting media after use.

14 Claims, 4 Drawing Sheets

PLIANT MEDIA BLASTING METHOD

This application is a continuation of application Ser. No. 376,764, filed Jul. 7, 1989 now abandoned.

The present invention relates to an improved blasting device for cleaning, degreasing and/or desooting a surface by using a pliant material of a desired porosity and size which is propelled by air pressure to impact against the surface and provide the necessary surface treatment.

DISCUSSION OF THE PRIOR ART

A variety of blasting devices are known in the prior art and such devices typically dispense materials which are relatively abrasive and heavy. The following six patents depict blasting devices and methods which are typical of the prior art.

U.S. Pat. No. 2,426,072 issued to Ridgewood et al on Aug. 19, 1947 relates to a method of projecting solid particles at high velocity against a surface to achieve the necessary cleaning. The disclosed projected particles are solid particles consisting of a synthetic resin having a desired impact strength and elongation and the contemplated materials are polymers.

U.S Pat. No. 2,624,988 issued to Vander Wal on Jan. 13, 1953 relates to a polishing and buffering liquid composition which is supplied at a pressure of approximately 200 pounds per square inch. The liquid composition is discharged, via flexible conduits, through nozzles and impinges on the article to be cleaned, and this can be seen in FIGS. 1 and 2. The liquid typically contains fragments of sponge rubber and fragments of felt, on the order of a quarter inch in diameter, which are used as a carrier for the abrasive material.

U.S. Pat. No. 2,652,662 issued to Newell on Sept. 22, 1953 relates to an improved blasting apparatus which prevents bridging or jamming of the blasting grit material. This is achieved by employing agitating means such as a conduit having a plurality of downwardly directed holes, extending within and across the tank, for discharging a plurality of fluid streams into the hopper in order to assure that the blasting grit material is uniformly discharged and does not jam the hopper or opening. The air supplied to the agitating means helps to pressurize the tank.

U.S. Pat. No. 2,910,812 issued to Brunner on Nov. 3, 1959 relates to a method of moistening black walnut shell grit so that it has greater impact and does not tend to accumulate a static charge which causes some of the grit particles to stick to the article being blasted. The reference teaches an arrangement in which water is sprayed from a nozzle, inside chamber, to moisten the black walnut shell grit to about a 10% moisture content.

U.S. Pat. No. 3,313,067 issued to Smith et al on Apr. 11, 1967 relates to a process for propelling discrete particles of polycarbonate resin having a mean diameter from about 25 mils to about 200 mils. The propelled particles have a velocity of between 50 and 300 feet per second and the particles are sprayed for a sufficient period of time to remove any "flashing" from the surface being treated.

U.S. Pat. No. 4,731,125 issued to Carr on Mar. 15, 1988 relates to a surface cleaning method for removing paint and other coatings from composite surfaces formed of reinforced matrix material. The projected media has a Mohs scale hardness number lower than 3.5 and is accelerated by air at a pressure of approximately 40 pounds per square inch. This patent also indicates that the blasting process has the ability to selectively remove outer layers of material while leaving the underlying layers intact.

Although the above-discussed prior art blasting equipment teaches that the use of particulate abrasive material to clean a surface is well-known, such devices are typically only useful for dispensing materials of large, individual grain sizes and high density while very pliant and low density materials cannot be effectively used. Moreover, the prior art blasting systems typically rely on gravity feed for inputting the blasting media into the pressurized air stream. When attempts are made to dispense a low density material from the known prior art blasting equipment, it is extremely difficult to obtain a constant metered flow of the material and bridging, jamming, etc., and other related feed problems quite often occur in such devices.

While the blasting media used in known blasting systems can often be recovered, screened and reused in various manners, in none of the known recovery systems is it possible to actually flush liquid contaminants captured in the pores of porous grit material, removed from the surface being cleaned, completely from the blasting media. Furthermore, many of the blasting materials used by the prior art have the disadvantage of generating substantial amounts of dust and contaminants.

OBJECTS OF THE INVENTION

Wherefore, it is a primary object of the invention to provide a cleaning, degreasing and/or desooting apparatus which can use various light, pliant materials to accomplish the desired surface treatment of an object, wall, or other article.

A second object of the invention is to employ a light material which is essentially free from dust and less aggressive to most surfaces than the known prior art blasting media.

A further object of the invention is to provide a supply container/mechanical feed arrangement which positively meters a desired quantity of the pliant blasting media into a pressurized air stream.

A still further object of the invention is to provide a system which allows the pliant blasting media to be recovered, separated, cleaned, flushed and/or dried so that the blasting media can be reused.

An additional object of the invention is to employ porous and/or non-porous blasting media which can be pretreated with liquids, powders, chemicals and/or solvents, before use, to enhance their action (cleaning, polishing, paint removing, etc.) of the surface.

A further object of the invention is to employ blasting media which is much safer for the operator of the blasting device to use and much easier to contain because the blasting media only has a minimal tendency to ricochet off the surface being treated.

Another object of the invention is to provide a media which is useful in treating (cleaning, degreasing and/or desooting) objects containing electrical wiring and other electronic components without damaging those electrical components.

A still further object of the invention is to reduce the amount of contaminated liquid generated during the cleaning and/or degreasing operation because the media entraps and carries away the contaminants, and does not merely dilute the contaminants.

The term "pliant blasting media", as used herein, means a light resilient material such as sponge, rubber, plastic or foam, including both open and closed cell, as well as other materials, such as hydrophilic sponge having a density of 50 lb/ft.$^3$ or less.

Briefly, the present invention relates to a blasting device, suitable for discharging pliant particulate media against surface to achieve a desired surface treatment, said blasting device comprising a storage container for containing a supply of pliant particulate blasting media; a discharge conduit having nozzle means connected to one end thereof; media feed means, connecting said storage container to an end of the discharge conduit remote from said nozzle means, for supplying a desired quantity of blasting media from the storage container to the other end of said discharge conduit; and air supply means connected to said discharge conduit, adjacent said media feed means, for supplying a flow of pressurized air thereto and means for substantially preventing the back flow of pressurized air into said media feed means, wherein said media feed means positively conveys said blasting media into said pressurized air flow in said discharge conduit.

A second embodiment of the invention relates to a method of abrasively treating a surface with blasting media, said method comprising the steps of mixing an air flow under pressure and pliant particulate media together to form a pressurized mixture thereof; and discharging said pressurized mixture against a surface to be treated to achieve the desired surface treatment.

DESCRIPTIONS OF THE DRAWINGS

The above and other objects of the invention will be further understood by having reference to the accompanying drawings which illustrate, by way of example, the preferred embodiments of the invention, it being understood that other embodiments employing the same basic principals and falling within the inventive concept may be made as will be readily apparent to those skilled in the art.

In the drawings.

Figure 1:
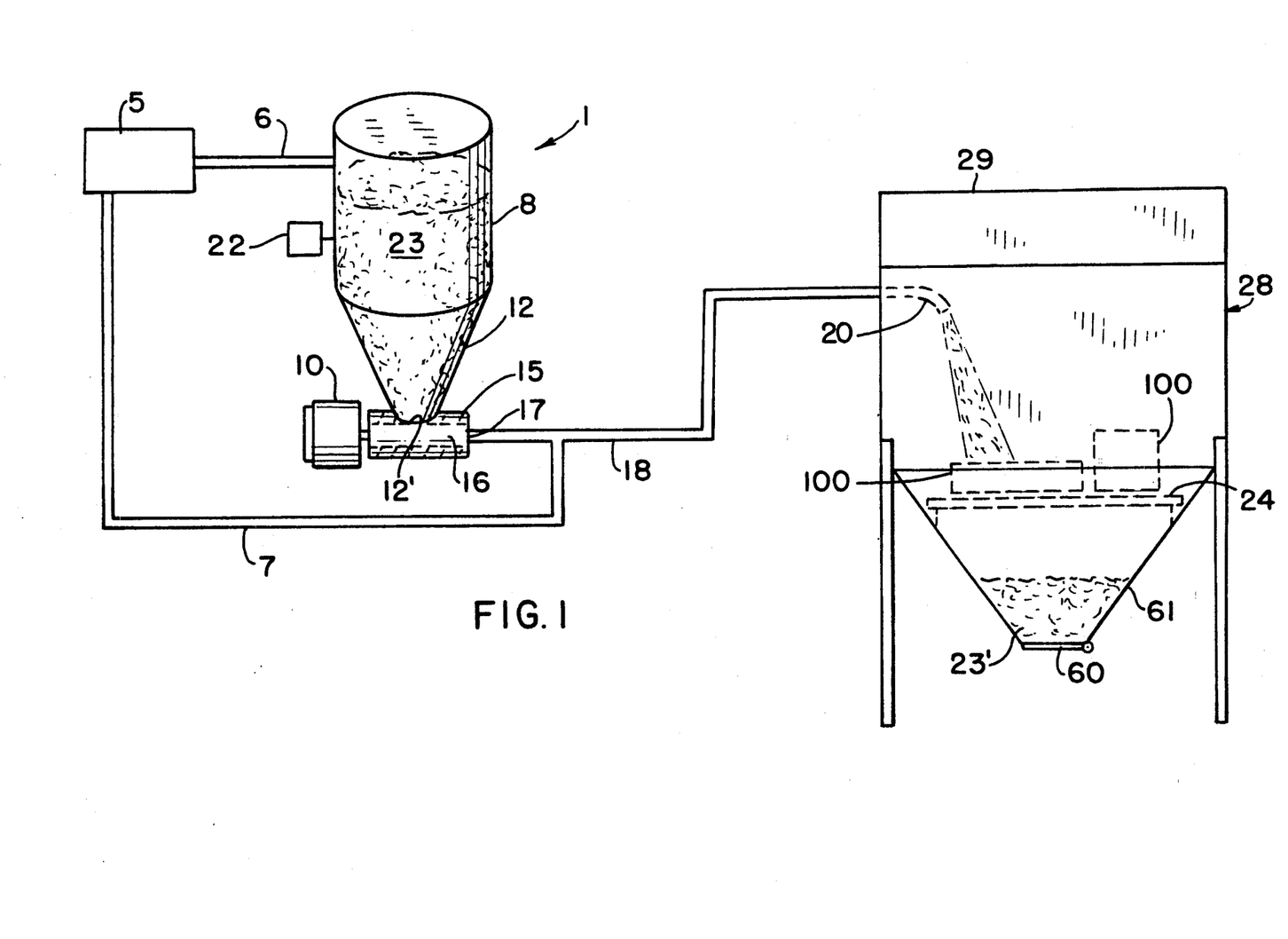
FIG. 1 is a diagrammatic representation of the pliant blasting media device of the present invention.

Turning first to FIG. 1, which shows a diagrammatic representation of the pliant media blasting device 1 of the present invention, the device comprises a hopper type storage container 8 which contains a supply of blasting media 23. The lower portion of the storage container 8 has a funnel-shaped portion 12 having an outlet 12' in the bottom thereof. An conveyer device 15 connects the outlet 12' of the storage container 8 with a discharge conduit or line 18 of preferably a $\frac{1}{2}$" I.D. pipe. The conveyer device 15 comprises a housing having a cylindrical internal bore containing a screw conveyor mechanism 16, driven by motor 10 at a desired rate of speed. The screw conveyer mechanism and the housing have a desired tolerance which ensures positive feeding of the media. The housing has an inlet (not shown) connected with the outlet 12' of the storage container and an outlet 17, remote from the housing inlet, connected with the discharge line 18. The conveyer device 15 positively and constantly meters the pliant blasting media 23 from the storage container to the discharge line.

An air supply source 5, such as model no. 185 distributed by the Ingresoll Rand Company, has a first air supply line 6 connected to the top portion of storage container 8 and a second air supply line 7 connected adjacent the connection between the discharge line 18 and the conveyer device 15. The air supply source provides pressured air at least 20 psi, and preferably at about 90 psi. As the blasting media enters into the discharge line 18 it is mixed with the pressurized air supply and then conveyed through the discharge line 18 to a discharge nozzle 20, shown in ghost in FIG. 1, where the pliant blasting media is discharged into a blasting vessel 28 to impact against the object or surface to be treated. In the above described device, it is to be noted that the entire blasting device, from the air supply source 5 to discharge the nozzle 20, is pressurized. Alternatively, a non-return valve 85 (see FIG. 2) could be positioned between the discharge line 18 and conveyer device 15 so that the conveyer device !5 and storage container 8 do not need to be pressurized.

The blasting vessel 28 is a closed container having a bottom, four sidewalls and a removable cover 29. The blasting container 28 typically has a funnel shaped bottom portion 61 which assists in the collection and recovery of the used blasting media 23'. If desired, a trap door 60 can be provided in the bottom of the vessel to facilitate removal of the used blasting media 23'. A supporting surface 24, such as a mesh screen or the like, is provided inside the vessel for supporting the objects 100 to be treated. The vessel is useful in batch processing in which the objects 100 are first placed inside the blasting vessel 28 on the support surface 24. Thereafter, the cover 29 is closed and secured in place and the pliant media blasting device 1 is activated. The media is then discharged from nozzle 20, positioned inside the blasting container 28, against the exterior surface of the objects 100 to be treated to accomplish the desired surface treatment. Once a sufficient amount of time has lapsed, the objects are checked and removed if they have been sufficiently treated. Thereafter, a second batch of objects can be treated or if the objects 100 were not sufficiently treated, they can be retreated.

In order to ensure that the pliant blasting media does not bridge or jam inside the storage container 8, and thus freely passes through the funnel-shaped portion 12 into the conveyer device 15, the storage container 8 is provided with agitation means such as vibrator device 22 located on the outside of the container, which shakes the container, or a rotatable agitator 21 (see FIG. 2) provided inside the container, which continuously mixes the media.

Figure 2:
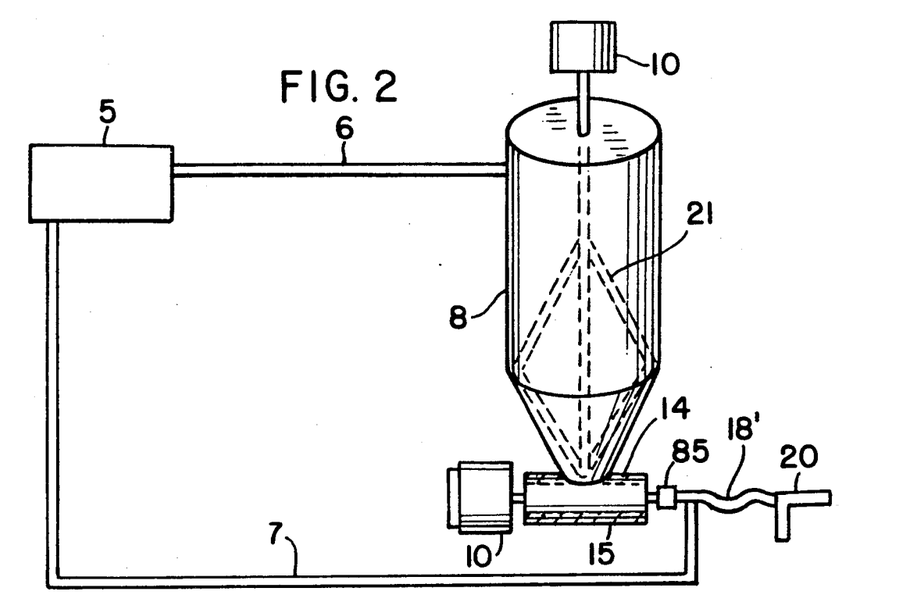
FIG. 2 is a diagrammatic representation of a second embodiment of the pliant blasting media device of the present invention.

Turning now to FIG. 2, this embodiment is similar to that shown in FIG. 1 and like elements are represented by like numerals. The major difference between this embodiment and the embodiment of FIG. 1 is the use of the agitator 21, located inside the storage container 8, and a motor 10 for rotating the same and the use of a flexible discharge line 18', located adjacent the nozzle 20. The rotation of the agitator 21 helps prevent bridging and jamming of the blasting media, during use, while the flexible discharge line 18' allows an operator of the blasting device i to precisely control the discharge direction, impingement angle, duration and other blasting parameters of the surface being treated. The device of FIG. 2 can be used in a closed area, such as a small room or the like, if desired. However, since the pliant blasting media only minimally ricochets off the surface, recovery of the blasting media is relatively easy regardless of where it occurs.

Figure 3:
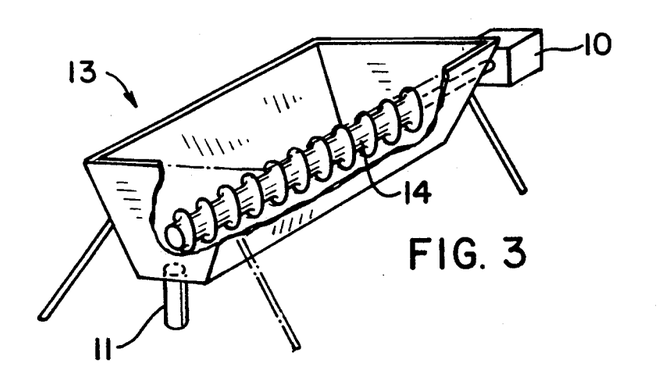
FIG. 3 is a perspective diagrammatic representation, shown partially cut away, of an alternative arrangement of the storage container for ensuring that a sufficient quantity of blasting media is supplied to the feed device.

FIG. 3 shows a trough-type supply tank 13 which could be used instead of the supply container 8. Tank 13 is provided with screw conveyor mechanism 14 in the bottom portion thereof for conveying the blasting media to an outlet 11 of the tank. The outlet is connected to a discharge line 18 via a positive feed mechanism (not shown) such as the conveyer device 15.

Figure 4:
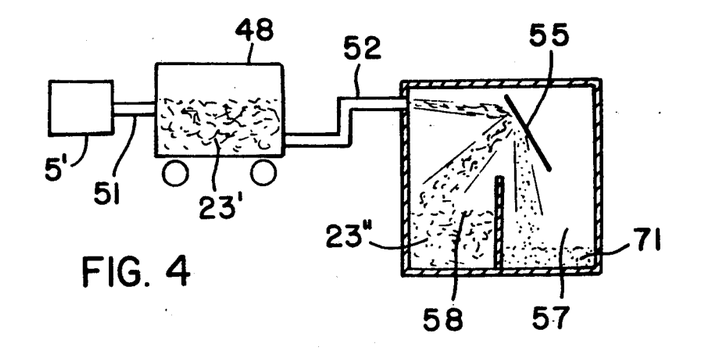
FIG. 4 is a diagrammatic representative of a device for separating recovered pliant blasting media.

FIG. 4 shows a device for separating used blasting media 23' by its physical characteristics (shape, size, resiliency, etc.). The used blasting media 23' is placed within a completely enclosed media supply container 48. Thereafter, air pressure is provided by air pressure source 5', via inlet supply conduit or line 51, and this pressurized air carries a portion of the recovered blasting media 23' contained in the container 48, through a discharge conduit or line 52, to a nozzle 54 which directs the blasting media against a deflection plate 55, typically made from metal. As a result of the characteristics of the blasting media 23', it will rebound off the deflection plate and fall into a second container 58, positioned away from the deflection plate 55, where the separated blasting media 23" is collected. The debris and other undesired material 71 are typically not as resilient and thus they will not rebound as far from the deflection plate 55 and will fall and collect in a first container 57, located adjacent the deflection plate. Other separation devices, such as a series of appropriately sized screens, could also be used to separate the blasting media from the debris.

Figure 5:
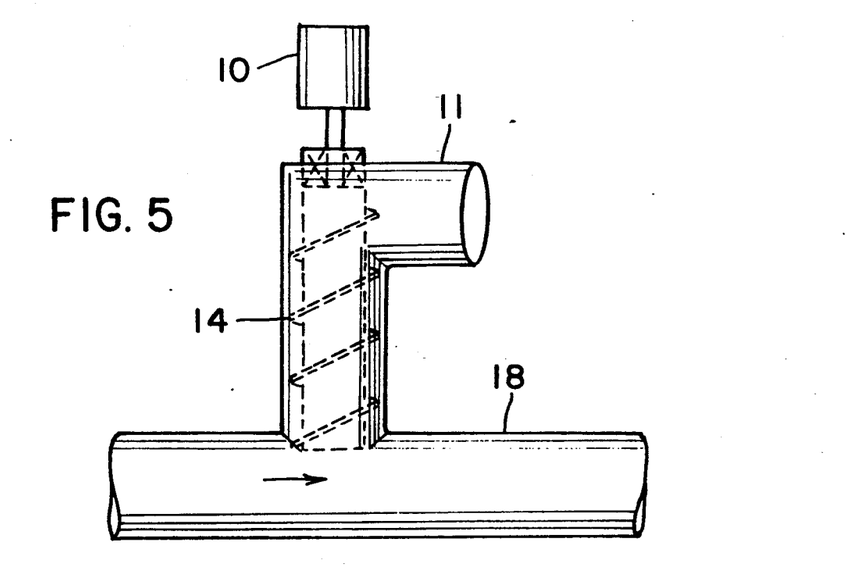
FIG. 5 shows second embodiment of the feed device for metering a sufficient quantity of blasting media into a discharge line.

FIG. 5 shows an alternate arrangement of the conveyer device 15 which is suitable for positively metering a constant amount of blasting media, in a vertical direction, from the supply container or tank into the discharge line 18. Such a feed mechanism could be used in combination with the trough-like supply tank of FIG. 3, for instance.

Figure 6:
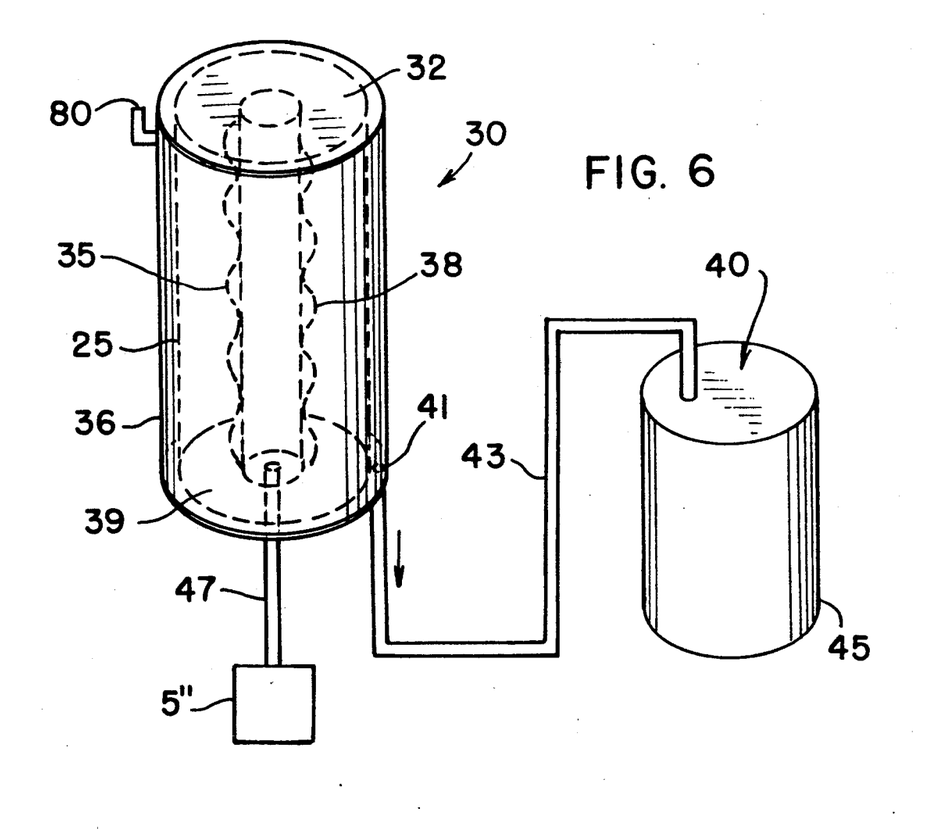
FIG. 6 shows a flushing apparatus for removing absorbed debris, liquids and/or chemicals from the pliant blasting media after use.

FIG. 6 shows a pliant media cleaning apparatus 30 used to remove absorbed liquids, chemicals and any remaining debris or undesired material from the separated blasting media 23". The cleaning apparatus 30 comprises a container having a bottom 39, a cylindrical sidewall 36 and a removable cover 32. An elongate cylindrical perforated wall 25, having a slightly smaller diameter (approximately 1 inches or so) than that of the sidewall 36, is positioned inside the container concentrically therewith. The perforations in the wall are sized to allow the waste material to pass therethrough but retain the blasting media. The region formed between the sidewall 36 and the preformed wall 25 is in direct communication with a bleed air inlet 80 and an outlet 41 of the container, the outlet allows the liquids and debris squeezed from the blasting media to be exhausted from the apparatus. The center of the container is provided with a perforated pipe 38, shown in ghost lines, having an expandable bladder 35, made from a durable rubber or other strong but resilient material, tightly fastened to its exterior surface adjacent the top and bottom of the container. The bladder 35 is shown in its deflated position in FIG. 6. The perforated pipe is supplied with pressurized air via supply conduit or line 47 and air pressure source 5" to thereby inflate the bladder when desired.

The blasting media is placed inside the apparatus 30 between the perforated wall 25 and the deflated expandable bladder 35. Once the apparatus has been filled with sufficient blasting media, removable cover 32 is then positioned to seal the apparatus. Thereafter, air pressure is supplied to expandable bladder 35, via pressure line 47, and this air pressure inflates the expandable bladder 35 and thereby compresses the pliant blasting media against the perforated wall 25. As the bladder 35 is further inflated and expanded it further compresses the blasting media against the perforated wall and thereby squeezes the absorbed liquids, chemicals and debris from the media. To assist in removal of the liquid squeezed from the media by this operation, vacuum can be applied to the interior of apparatus 30, via a vacuum source 40, vacuum line 43, and outlet 41. The air inlet 80 allows only a small amount of air to enter into the apparatus so that a desired vacuum is maintained within the chamber. This vacuum assists with the compression the media and carries away the liquid and debris from the apparatus. The removed material is collected inside the recovery tank 45 of the vacuum source 40 where it thereafter can be appropriately disposed of, depending upon its composition. If the media is not adequately cleaned, it can be subjected to additional clean cycles. Other compression means, such as a press and screen arrangement, can be used for removing absorbed liquids from the blasting media.

Figure 7:
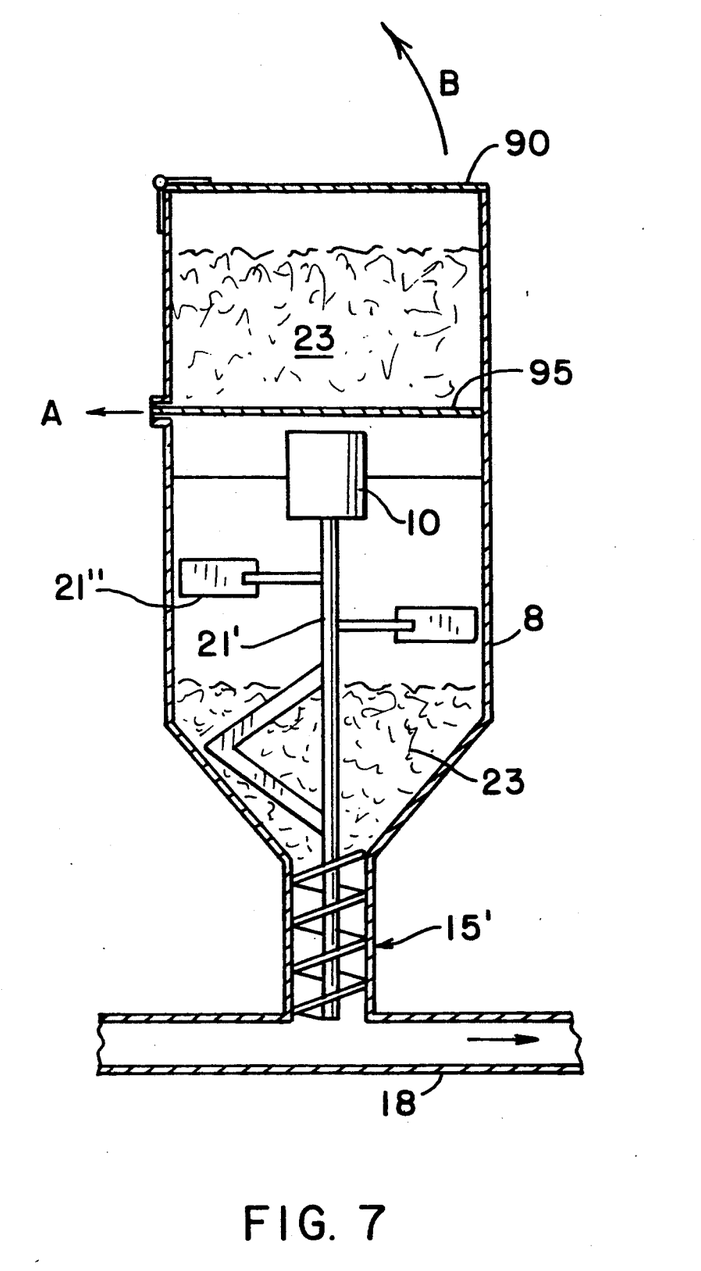
FIG. 7 is a diagrammatic representation of an alternative arrangement of the storage container and feed mechanism.

Turning now to FIG. 7, a third embodiment of the storage container is shown in which the conveyer device 15' and the rotatable agitator 21' are aligned vertically on the same axis and are both rotated by motor 10. The rotatable agitator 21' can be provided with a series of paddles or other agitation members 21" to agitate the media contained within the container and ensure the continuous supply of media to the conveyer device 15'. The top portion of the container is provided with two doors 90, 95 which are both arranged above the motor 10. The first door 90 can be pivoted open, in the direction of arrow B, to allow additional blasting media to be added to the top portion of the storage container, i.e. on top of door 95. When the lower portion of the storage container 8 requires addition media, the first door 90 is pivoted closed and the second door 95 can thereafter be slide in the direction of arrow A to open the door and allow the blasting media to fall into the storage container without interrupting operation of the device. It is to be noted that both of the doors are provided with air-tight seals which enable them to withstand the applied pressures.

If necessary, a solvent, chemical or other cleansing agent can be added to the pliant blasting media in the apparatus 30 and allowed to act for a time, before the bladder is inflated. The addition of such additives help dissolve and/or remove harmful liquids or chemicals from the pliant blasting media. In addition, the pliant blasting media can be pretreated with a solvent, chemical, cleansing agent, liquid and/or powder, before the blasting media is used in the device 1, to enhance the media's surface treatment. Depending on the amount of liquid absorbed by the media, this will increase the density of the media and thereby increase its abrasiveness. An important feature of the pliant blasting media is its ability to entrap debris, liquids, solvents, etc., within its interstices and carry such materials away from the surface being treated.

It is anticipated that the pressure applied to expandable bladder 35 will be between 20 and 60 psi, preferably 45 psi, and the partial vacuum applied to the apparatus will be between 20 and 22 inches of mercury. This combination of pressure and vacuum will ensure that the flushed blasting media, if unacceptable for reuse, can be safely disposed of in a land fill. However, other pressure and vacuum combinations will also work and are considered to be within the spirit and scope of the invention herein involved.

Since certain changes may be made in the above described pliant media blasting device, separation device and cleaning system, without departing from the spirit and scope of the invention herein involved, it is intended that all subject matter contained in the above description and shown in the accompanying drawing shall be interpreted in an illustrated and not in the limiting sense.

Wherefore, I claim:

1. A method of treating a contaminated surface with a plurality of discrete, individual particles of a pliant particulate blasting media capable of absorbing a contaminant from said surface comprising a dry light resilient absorbent cellular material pretreated with a dry powder to increase the density and abrasiveness of said media, said method comprising the steps of
   a) positively conveying said pliant blasting media comprising a dry light resilient absorbent cellular material pretreated with a dry powder to increase the density and abrasiveness of said media from a storage container into a discharge conduit;
   b) supplying an air flow under pressure to said discharge conduit;
   c) mixing said air flow and said pliant blasting media together to form a pressurized mixture thereof in said discharge conduit; and
   d) discharging said pressurized mixture against the contaminated surface and absorbing contaminant from said surface with said absorbent cellular material.

2. A method according to claim 1, wherein the step of positively conveying said pliant blasting media comprises the steps of:
   a) positioning a screw conveyor, having a housing with an inlet and an outlet, adjacent an outlet of a storage container; and
   b) rotating said screw conveyor in one direction to positively convey aid pliant blasting media from the storage container to the discharge conduit.

3. A method according to claim 2, further comprising the step of providing means for preventing jamming and bridging of said pliant blasting media in the storage container to ensure a continuous supply of said pliant blasting media to said screw conveyor.

4. A method according to claim 1, further comprising the steps of:
   a) collecting said pliant blasting media after discharge; and
   b) separating said pliant blasting media from the contaminant.

5. A method according to claim 1, further comprising the step supplying the air flow at a pressure of at least 20 psi.

6. A method according to claim 1, comprising the step supplying the air flow at a pressure of at least 90 psi.

7. A method according to claim 1, comprising the steps of:
   a) collecting said pliant blasting media after discharge; and
   b) cleaning the collected pliant blasting media to remove absorbed contaminant from said pliant blasting media.

8. A method according to claim 7, further comprising the step of reusing said pliant blasting media for further blasting after cleaning.

9. A method of treating a contaminated surface with a plurality of discrete, individual particles of a pliant particulate blasting media capable of absorbing a contaminant from said surface comprising a dry light resilient absorbent cellular material pretreated with a dry powder to increase the density and abrasiveness of said media, said method comprising the steps of:
   a) positioning a screw conveyor, having a housing with an inlet and an outlet, adjacent an outlet of a storage container;
   b) rotating said screw conveyor to positively convey said pliant blasting media comprising a dry light resilient absorbent cellular material pretreated wit a dry powder to increase the density and abrasiveness of said media from the storage container to a discharge conduit;
   c) supplying an air flow under pressure to said discharge conduit;
   d) mixing said air flow and said pliant blasting media together to form a pressurized mixture thereof in said discharge conduit;
   e) discharging said pressurized mixture against the contaminated surface, thereby absorbing within said pliant absorbent cellular blasting media, contaminant from said surface;
   f) preventing jamming and bridging of said pliant blasting media in the storage container to ensure a continuous supply of said pliant blasting media to the screw conveyor;
   g) collecting the discharged pliant blasting media containing absorbed contaminant;
   h) removing the absorbed contaminant from said pliant blasting media.

10. A method according to claim 9, further comprising the steps of:
    a) disposing of the absorbed contaminant removed during the cleaning step; and
    b) reusing said pliant blasting media after cleaning.

11. A method of treating a surface with a plurality of individual, discrete particles of a pliant particulate blasting media comprising a dry light resilient absorbent cellular material pretreated with a dry powder to increase the density and abrasiveness of said media and capable of absorbing a contaminant from said surface, said method comprising the steps of:
    a) positioning screw conveyor means, having a housing with an inlet and an outlet, adjacent an outlet of a storage container containing a supply of said pliant blasting media pretreated with a dry powder to increase the density and abrasiveness of said media;

b) dividing the storage container with first and second air tight door means into first and second compartments, the first compartment being defined between said screw conveyor means and the first door means and the second compartment being defined between the first door means and the second door means;

c) feeding said pliant blasting media from the second compartment into the first compartment;

d) rotating said screw conveyor means to positively convey said pliant blasting media from the first compartment into a discharge conduit;

e) supplying a flow pressurized air to said discharge conduit so that said pliant blasting media and the pressurized air can mix together to form a pressurized mixture thereof; and f) discharging said pressurized mixture against a contaminated surface and absorbing contaminant from said surface with said absorbent cellular material.

12. A method according to claim 11, further comprising the step of providing means for preventing jamming and bridging of said pliant blasting media in the storage container to ensure a continuous supply of said pliant blasting media to said screw conveyor.

13. A method according to claim 12, comprising the step of supplying the flow of pressurized air at about 90 psi.

14. A method according to claim 11, further comprising the steps of:

a) collecting said pliant blasting media after discharge;

b) cleaning said pliant blasting media to remove any absorbed contaminant therefrom;

c) disposing of the absorbed contaminant removed during the cleaning step; and d) reusing said pliant blasting media for further blasting after cleaning.

* * * * *

UNITED STATES PATENT AND TRADEMARK OFFICE
CERTIFICATE OF CORRECTION

PATENT NO.  : 5,146,716
DATED       : September 15, 1992
INVENTOR(S) : William R. Lynn It is certified that error appears in the above-indentified patent and that said Letters Patent is hereby corrected as shown below:

Column 4, line 2, "a 1/2" should read -- a 3/4 --.
Column 4, line 33, "device 15" should read -- device 15 --.
Column 5, line 8, "device i" should read -- device 1 --.
Cp;i,m 8, line 29, "pretreated wit" should read -- pretreated with --.

Signed and Sealed this

Fifteenth Day of March, 1994

Attest:

BRUCE LEHMAN

Attesting Officer    Commissioner of Patents and Trademarks